Sept. 18, 1923.

P. W. JOHNSON

AUXILIARY STEERING DEVICE

Filed Oct. 26, 1921

1,468,448

Inventor
PAUL W. JOHNSON
By Attorney
Richard J. Cook

Patented Sept. 18, 1923.

1,468,448

UNITED STATES PATENT OFFICE.

PAUL W. JOHNSON, OF TACOMA, WASHINGTON, ASSIGNOR TO J. & B. STABILIZER CORP., OF TACOMA, WASHINGTON, A CORPORATION OF WASHINGTON.

AUXILIARY STEERING DEVICE.

Application filed October 26, 1921. Serial No. 510,429.

*To all whom it may concern:*

Be it known that I, PAUL W. JOHNSON, a citizen of the United States, and a resident of the city of Tacoma, county of Pierce, State of Washington, have invented certain new and useful Improvements in Auxiliary Steering Devices, of which the following is a specification.

This invention relates to improvements in auxiliary steering devices for use in connection with the steering mechanism of automobiles and similar motor driven vehicles. More particularly the invention relates to mechanism for stabilizing the steering mechanism by resisting the vibration incidenal to travel over rough and uneven roads.

It is the principal object of this invention to provide a stabilizing device that may be fixed to the front axle of a motor driven vehicle and which has a yieldingly mounted lever connected thereto and with the steering wheel connecting rod whereby the wheels of the vehicle are normally held in a straight forward position and the usual vibration of the connecting rod is overcome, thereby lessening the strain on the arms of the driver and insuring greater safety in driving.

It is also an object of the invention to provide a device of the above character comprising a supporting bracket that may be rigidly fixed to a vehicle axle and which has an arm pivotally mounted thereon and connected with the steering wheel connecting rod; said arm having laterally extending portions at opposite sides of its pivotal point which engage with a bar that is yieldably supported on the bracket and whereby the arm is normally retained in such position as to steer the vehicle in a straight course but which will yield when it is desired to turn the vehicle from a straight course.

Other objects of the invention reside in the details of construction and combination of parts forming the device.

In accomplishing the objects of the invention, I have provided the improved details of construction, the preferred forms of which are illustrated in the accompanying drawings, wherein—

Referring more in detail to the several views of the drawings, wherein like reference numerals designate the same or like parts—

Figure 1:
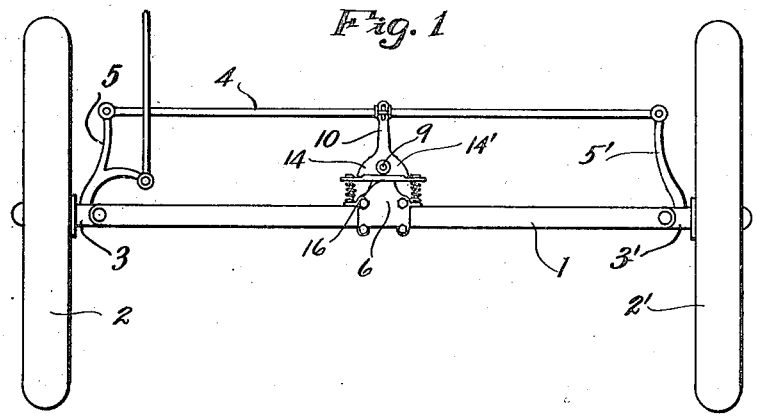
Fig. 1 is a plan view of the front axle, steering wheels and steering wheel connecting rod of a motor vehicle with a stabilizing device mounted on the axle and connected with said rod according to the present invention.
Figure 2:
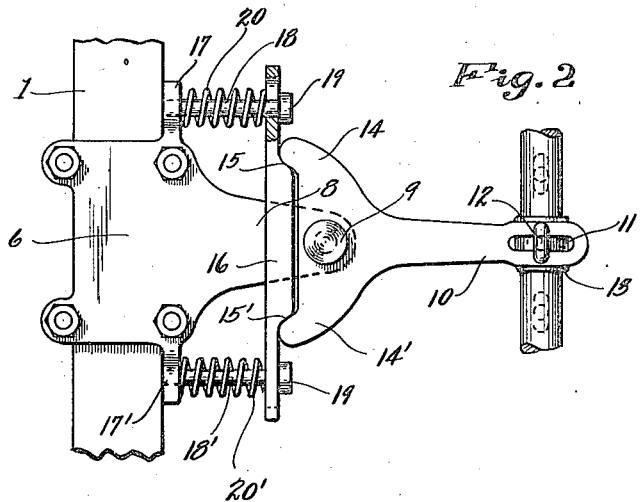
Fig. 2 is an enlarged plan view of the stabilizing device.
Figure 3:
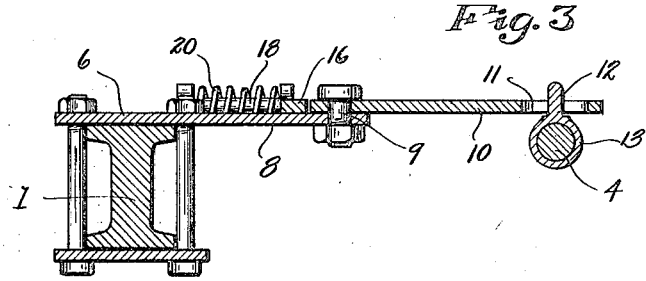
Fig. 3 is a longitudinal sectional view of the same.

1 designates the front axle, 2 and 2' the steering wheels mounted on steering knuckles 3 and 3' at opposite ends of the axle and 4 a rod connecting the arms 5 and 5' of the said knuckles.

Mounted upon the axle 1, preferably at about the center is a stabilizing device constructed according to the present invention, comprising a plate 6 which overlies the axle and is secured thereto by means of bolts at its ends. Extending rearwardly from the body of the plate is an arm 8 and pivotally mounted thereon by means of a bolt 9, is a rearwardly extending lever 10.

At its rearward end the lever is provided with a longitudinally directed slot 11 whereinto a stud 12 that projects upwardly from a collar 13 that is fixed to the rod 4, extends to effect a connection between the rod and lever. At its forward end the lever is provided at opposite sides of its pivotal point with laterally and forwardly extending portions 14 and 14' provided at the ends with rounded bearing surfaces which are adapted to normally seat against opposing shoulders 15 and 15' formed on a bar 16 that is supported from the bracket plate 6 substantially parallel with the axle.

Formed on the plate 6 at its opposite sides are upwardly standing lugs 17 and 17', and mounted therein are rearwardly extending bolts 18 and 18'. The bar 16 above mentioned is supported at its opposite ends from these bolts; it being provided adjacent its opposite ends with longitudinally extending slots through which the bolts extend and the latter are equipped with heads 19 at their ends whereby the bar is held functionally thereon. Coiled springs 20 and 20' are mounted about the bolts and these bear at their opposite ends against the lugs 17—17' and the ends of the bar to hold the latter yieldingly against inward movement.

It is apparent that with the parts of the device so constructed and assembled, the pressure of the springs against the ends of the bar and the pressure of the bar against the laterally extended bearing portions of the steering lever, the latter will be yieldingly held against movement and the usual vibration of the connecting rod will be overcome and the vehicle held in a straight course.

The construction as described provides that longitudinal movement of the connecting rod will effect pivotal movement of the lever and that this movement will be resisted by the pressure of the springs against the bar 16. This resistance may be easily overcome by operation of the steering wheel and is not apparent when the vehicle is turned to one side or the other.

Such a device can be easily and quickly attached to a vehicle and in use will relieve the driver of arm strain and will add to the safety of driving.

Having thus described my invention, what I claim as new therein and desire to secure by Letters Patent is:

1. The combination with a vehicle axle and a steering wheel connecting rod of a stabilizing device comprising a supporting plate fixed to said axle and having a rearwardly extending arm, bolts fixed in the plate to extend in the direction of the arm at opposite sides thereof, a bar extended between the bolts and having slotted ends receiving the same, springs mounted on the bolts and engaging the ends of the bar to resist inward movement thereof, a lever connected at one end with the wheel connecting rod and at its opposite end pivotally mounted on said plate arm and having portions extending laterally therefrom at opposite sides of the pivotal mounting and seated against said bar whereby pivotal movement of the lever is yieldingly resisted.

2. The combination with a vehicle axle and a steering wheel connecting rod, of a stabilizing device comprising a supporting plate fixed to the said axle and having a rearwardly extending arm, lugs formed on the plate at opposite sides of the arm, bolts mounted in said lugs and extended rearwardly along opposite sides of the arm, springs coiled about said bolts and seated against the lugs, a bar having slotted ends slidably receiving said bolts and seated against the outer ends of said springs, said bar having shoulders formed thereon on its outer face and at opposite sides of the arm, a lever connected pivotally at its outer end to the wheel connecting rod and mounted pivotally at its inner end on the said plate arm and having portions extending laterally therefrom at opposite sides of said pivotal mounting and seated at their ends against said bar shoulders whereby pivotal movement of the lever effects inward movement of the bar and the compression of said springs.

Signed at Seattle, Washington, this 20th day of October, 1921.

PAUL W. JOHNSON.